(12) United States Patent
Pathak et al.

(10) Patent No.: US 8,739,077 B1
(45) Date of Patent: May 27, 2014

(54) METHODS OF MODIFYING A PHYSICAL DESIGN OF AN ELECTRICAL CIRCUIT USED IN THE MANUFACTURE OF A SEMICONDUCTOR DEVICE

(71) Applicant: GLOBALFOUNDRIES, Inc., Grand Cayman, KY (US)

(72) Inventors: Piyush Pathak, Fremont, CA (US); Piyush Verma, Sunnyvale, CA (US); Sarah N. McGowan, San Francisco, CA (US)

(73) Assignee: Globalfoundries, Inc., Grand Cayman (KY)

( * ) Notice: Subject to any disclaimer, the term of this patent is extended or adjusted under 35 U.S.C. 154(b) by 0 days.

(21) Appl. No.: 13/782,826

(22) Filed: Mar. 1, 2013

(51) Int. Cl.
*G06F 17/50* (2006.01)
(52) U.S. Cl.
USPC .................. 716/52; 716/50; 716/51; 716/53; 716/54; 716/55; 716/56
(58) Field of Classification Search
USPC ...................................................... 716/50–56
See application file for complete search history.

(56) References Cited

U.S. PATENT DOCUMENTS

| 6,892,367 | B2 * | 5/2005 | Palusinski et al. | 716/52 |
|---|---|---|---|---|
| 7,418,693 | B1 * | 8/2008 | Gennari et al. | 716/55 |
| 7,555,736 | B2 | 6/2009 | Cadouri | |
| 2003/0115569 | A1 * | 6/2003 | Ikeuchi | 716/19 |
| 2008/0141195 | A1 * | 6/2008 | Torres Robles et al. | 716/5 |
| 2009/0291512 | A1 * | 11/2009 | Izuha et al. | 438/16 |
| 2010/0122227 | A1 | 5/2010 | Waller | |
| 2012/0144351 | A1 * | 6/2012 | Torres Robles et al. | 716/52 |
| 2012/0204134 | A1 * | 8/2012 | Topaloglu | 716/52 |
| 2012/0317524 | A1 * | 12/2012 | Taoka | 716/53 |
| 2013/0305195 | A1 * | 11/2013 | Robles et al. | 716/52 |

* cited by examiner

Primary Examiner — Stacy Whitmore
(74) Attorney, Agent, or Firm — Ingrassia Fisher & Lorenz, P.C.

(57) ABSTRACT

Methods for modifying a physical design of an electrical circuit used in the manufacture of a semiconductor device, and methods for fabricating an integrated circuit, are provided. In an embodiment, a method includes providing a circuit design layout that has a plurality of element patterns. A first library of problematic sections is provided. An initial circuit section and an additional circuit section within the circuit design layout are determined to match problematic sections in the first library, and the initial and additional circuit sections have overlapping peripheral boundaries. A second library of replacement sections is provided. The replacement sections correspond to the problematic sections. The circuit sections that match the problematic sections are replaced with a replacement section that corresponds to the respective problematic sections to form the final circuit layout. Boundary characteristics of the replacement sections are substantially the same as the circuit sections replaced thereby.

20 Claims, 5 Drawing Sheets

METHODS OF MODIFYING A PHYSICAL DESIGN OF AN ELECTRICAL CIRCUIT USED IN THE MANUFACTURE OF A SEMICONDUCTOR DEVICE

TECHNICAL FIELD

The technical field generally relates to methods for modifying a physical design of an electrical circuit used in the manufacture of a semiconductor device, and more particularly relates to methods that include identifying and replacing problematic element patterns in a circuit design layout to form a final circuit layout that is used to generate a mask employed to form the semiconductor device.

BACKGROUND

Modern integrated circuits (ICs), can include millions of transistors fabricated in and on a semiconductor substrate. In making a mask to fabricate such a complex device, a circuit design layout will pass through a variety of filters, checks, and modifications before being taped out to a mask. Ideally, the process results in a mask that is used to lithographically fabricate a final circuit design layout on a semiconductor substrate without printing defects and without defects in the fabricated final circuit layout.

The circuit design layout may contain standard cells and standard device designs as well as new cell and device designs, and generally complies with rigid design rules that include minimum feature size, minimum spacing between device elements, and the like. To improve functional and yield characteristics of the circuit design layout, the circuit design layout generally passes through multiple simulations, many of which are time consuming. Short cuts are available to reduce simulation time, and hence cost, without sacrificing accuracy of the final circuit layout. One method for providing approximate but fast evaluation of sensitivity of the circuit design layout to lithographic effects that can affect variability and yield is pattern matching. Pattern matching is particularly known for use to determine lithographic or printability problems. Printability problems are problems in which a circuit design layout on a mask, for example a particular array of lines and spaces, cannot be accurately reproduced in or on a semiconductor substrate by etching through the circuit design layout on the mask. In conventional pattern matching techniques, element patterns in the circuit design layout that are known to cause printability problems are first identified by comparing element patterns in the circuit design layout at sensitive locations to a library of problematic element patterns. The library of problematic element patterns is generally developed in collaboration between a design house and their foundry partner and is further recorded to enable the problematic element patterns to be avoided in implementing future designs or design revisions. In practice, an evolving layout pattern can be subjected to pattern matching software to identify patterns in the layout design that are similar to the library patterns.

Upon identifying element patterns in the circuit design layout that are similar to problematic element patterns in the library, existing techniques involve changing the problematic element patterns through a global rule change that is applied based upon the identified defect in the problematic element pattern. In particular, the global rule change involves modifying a particular design parameter that is responsible for the problems associated with particular problematic element features, with the modification applied across the entire circuit design layout. However, the global approach to modifying the entire circuit design layout may result in modifications to the circuit design layout that may be unnecessary or that may cause unintended problems at various locations within the circuit design layout.

Accordingly, it is desirable to provide methods for modifying the physical design of an electrical circuit used in the manufacture of a semiconductor device that enables a local approach to alleviating problematic element patterns and that avoids unintended modifications to the circuit design layout that may be unnecessary or that may cause unintended problems after modification of the problematic element patterns. Furthermore, other desirable features and characteristics of the present invention will become apparent from the subsequent detailed description and the appended claims, taken in conjunction with the accompanying drawings and the foregoing technical field and background.

BRIEF SUMMARY

Methods for modifying a physical design of an electrical circuit used in the manufacture of a semiconductor device, and methods for fabricating an integrated circuit, are provided. In an embodiment, a method for modifying a physical design of an electrical circuit used in the manufacture of a semiconductor device includes providing a circuit design layout that has a plurality of element patterns. A first library is provided that includes problematic sections that include a problematic element pattern. The first library is stored in a storage medium. An initial circuit section that includes an element pattern within the circuit design layout, and that includes a peripheral boundary, is determined to match a problematic section in the first library using a computer processor that is in communication with the storage medium. Another circuit section that includes another element pattern within the circuit design layout is determined to match another problematic section in the first library using the computer processor that is in communication with the storage medium. The other circuit section includes a peripheral boundary that overlaps the peripheral boundary of the initial circuit section. A second library of replacement sections is provided and stored in the storage medium. The replacement sections include a replacement element pattern and correspond to the problematic sections. Only the circuit sections that match the problematic sections are replaced with a replacement section that corresponds to the respective problematic sections using the computer processor to form a final circuit layout including the replacement sections and original sections of the circuit design layout.

In another embodiment, a method for fabricating an integrated circuit includes providing a circuit design layout for a mask. The circuit design layout has a plurality of element patterns. A first library is provided that includes problematic sections that include a problematic element pattern. The first library is stored in a storage medium. An initial circuit section that includes an element pattern within the circuit design layout, and that includes a peripheral boundary, is determined to match a problematic section in the first library using a computer processor that is in communication with the storage medium. Another circuit section that includes another element pattern within the circuit design layout is determined to match another problematic section in the first library using the computer processor that is in communication with the storage medium. The other circuit section includes a peripheral boundary that overlaps the peripheral boundary of the initial circuit section. A second library of replacement sections is provided and stored in the storage medium. The replacement sections include a replacement element pattern and correspond to the problematic sections. The circuit sections that match the problematic sections are replaced with a replacement section that correspond to the respective problematic sections using the computer processor. Boundary characteristics of the replacement sections are substantially the same as the circuit sections replaced by the replacement sections. The mask including the replacement sections and original sections of the circuit design layout is generated to transfer a final circuit layout to the mask. The mask is employed to implement the final circuit layout in or on a semiconductor substrate of the integrated circuit.

In another embodiment, a method for fabricating an integrated circuit includes providing a circuit design layout for a mask. The circuit design layout has a plurality of element patterns. A first library is provided that includes problematic sections that include a problematic element pattern having a known printing or electrical problem associated with the problematic element pattern. The first library is stored in a storage medium. A determination is sequentially made whether circuit sections that include element patterns within the circuit design layout match aproblematic section in the first library using a computer processor in communication with the storage medium. An initial circuit section matches a problematic section in the first library and another circuit section that includes another element pattern within the circuit design layout matches another problematic section in the first library. The other circuit section includes a peripheral boundary that overlaps the peripheral boundary of the initial circuit section. At least one of the initial replacement section or the other replacement section contains at least one new vertex that is confined within a peripheral boundary thereof. The at least one new vertex is also within a peripheral boundary of the overlapping circuit section. A second library of replacement sections is provided and stored in the storage medium. The replacement sections include a replacement element pattern and correspond to the problematic sections. Circuit sections that have fewer new vertices within the peripheral boundary of the overlapping circuit section and that match a problematic section are replaced with replacement sections that correspond to the problematic sections using the computer processor before replacing circuit sections that have more new vertices within the peripheral boundary of the overlapping circuit section. Boundary characteristics of the replacement sections are substantially the same as the circuit sections that are replaced by the replacement sections. The mask including the replacement sections and original sections of the circuit design layout is generated to transfer a final circuit layout to the mask. The mask is employed to implement the final circuit layout in or on a semiconductor substrate of the integrated circuit.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Methods for modifying a physical design of an electrical circuit used in the manufacture of a semiconductor device, such as an integrated circuit, are provided herein. The methods provided herein enable identification and alleviation of problematic element patterns within a circuit design layout, i.e., a new or candidate circuit pattern that is proposed for implementing into a semiconductor device, using a pattern-based approach. Problematic element patterns may include element patterns that present printing difficulties and/or an electrical problem when the element pattern is transferred in or on a semiconductor substrate of the semiconductor device. To alleviate the problematic element patterns within the circuit design layout, the methods provided herein enable replacement of the problematic elements patterns with a replacement pattern, which is implemented locally for each identified problematic element pattern. In this regard, replacement of the problematic element patterns is conducted through a pattern-based approach that is independently conducted for each instance of different problematic element patterns in the circuit design layout, as opposed to alleviating the problematic element patterns with a rules-based approach that modifies similar element patterns globally across the circuit design layout. Further, the methods described herein enable overlapping problematic sections that are identified in the circuit design layout to be replaced while minimizing potential defects that could result from replacement of the overlapping problematic sections. The pattern-based approach avoids unintended modifications to the circuit design layout that may be unnecessary or that may cause unintended problems at various locations after modification of the problematic element patterns.

An embodiment of a method for modifying a physical design of an electrical circuit used in the manufacture of a semiconductor device will now be described with reference to FIG. 1. The method for modifying the physical design of the electric circuit is conducted before the tape-out of a mask or masks for purposes of transferring the physical design into an underlying substrate. A "mask" as referred to herein is a medium that transfers its image (patterns on the mask) on a photoresist coating over a semiconductor substrate. Semiconductor devices for which the mask can be used include any such devices where pattern etch through a mask is employed, such as for purposes of forming vias and trenches that are later filled to form an electrical circuit in the semiconductor devices.

Figure 1:
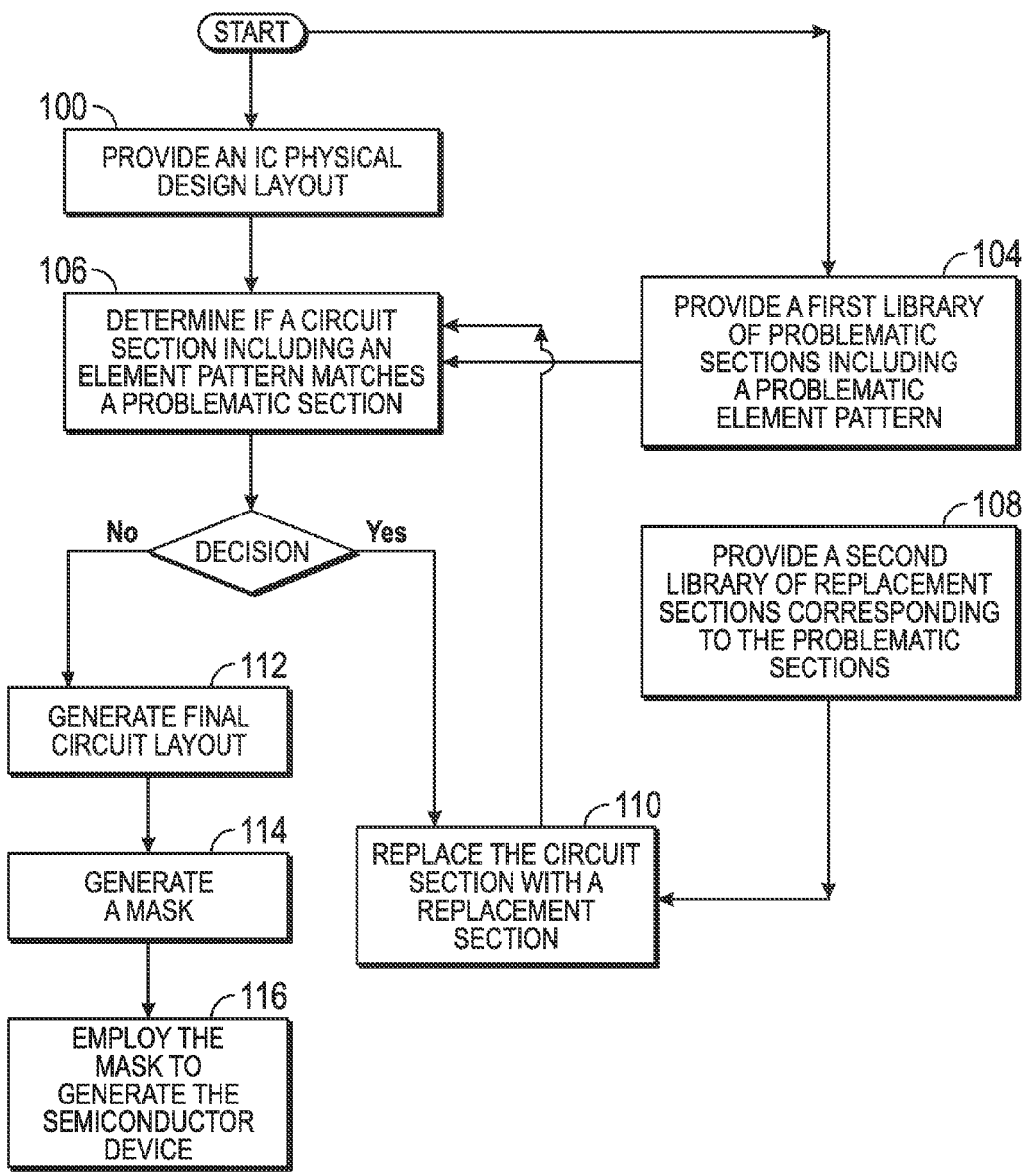
FIG. 1 is a flow chart illustrating a method for fabricating a semiconductor device in accordance with an embodiment.
Figure 2:
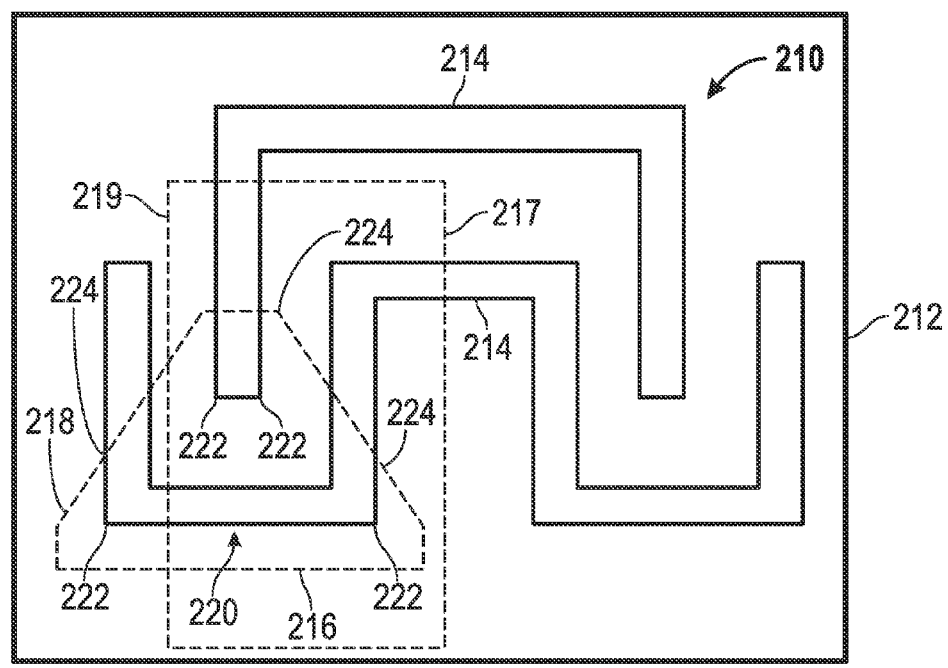
FIG. 2 is a schematic top view of a circuit design layout including a plurality of element patterns in accordance with an exemplary embodiment.

Referring to FIG. 1, the method begins by providing a circuit design layout in block 100. The circuit design layout 210, as referred to herein and momentarily referring to FIG. 2, is a candidate or preliminary pattern that is proposed for implementing into the semiconductor device, such as an integrated circuit, and that is represented in a two-dimensional plane 212 in the form of lines 214 that form element patterns. In an embodiment, the circuit design layout is generated using a computer program that is executed by a computer processor, and the circuit design layout may be stored within a storage medium that is in electrical communication with the computer processor.

In an embodiment and as shown at block 104 in FIG. 1, a first library of problematic sections that include a problematic element pattern is provided. Problematic element patterns, as referred to herein, refer to element patterns that have a known problem associated therewith. Problems that are associated with the problematic element patterns are not particularly limited and can be any problem that would make identification of and replacement of the problematic element patterns desirable. Examples of problems that may make replacement of the problematic element patterns desirable include, but are not limited to, printing problems or electrical problems in an electrical circuit that are formed in the shape of the element patterns. The first library of problematic sections that include a problematic element pattern can be stored in the storage medium that is in electrical communication with the computer processor, thereby enabling the computer processor to access the first library. In accordance with the methods described herein, the first library can be built or can be obtained from an outside service provider, and the problematic sections in the first library can be created using simulation results or using results from actual implementation of element patterns where problems are experienced, such as by fabricating physical test structures.

Referring to block 106 in FIG. 1, the method further includes determining if a circuit section or circuit sections match a problematic section in the first library using the computer processor that is in communication with the storage medium. As alluded to above and with reference to FIG. 2, the circuit design layout 210 has a plurality of element patterns 220 that, together, form the circuit design layout 210. In an embodiment, the circuit section 216 includes an element pattern 220 within the circuit design layout 210. In other embodiments and although not shown, the circuit section may include the entire circuit design layout 210. As referred to herein, determining if the circuit section matches a problematic section includes comparing problematic sections from the first library to various element patterns across the circuit design layout 210, and identifying a circuit section 216 based on a confirmed match. Referring again to FIG. 2, the circuit section 216 includes a peripheral boundary 218 in the two-dimensional plane 212, with the element pattern 220 contained within the peripheral boundary 218. In particular, the circuit section 216 includes the element pattern 220 that represents a sufficiently small portion of the overall circuit design layout 210 that can be analyzed to determine if any of the features in the element pattern 220 are problematic. It is to be appreciated that the peripheral boundary 218 can have any shape, including a polygonal shape or a circular shape, and that the shape of the peripheral boundary 18 will generally correspond to a shape of the problematic section from the first library. Referring to FIG. 2, although the peripheral boundary 218 of the circuit section 216 is shown in a polygonal shape, it is to be appreciated that similar or different shapes may be employed for different circuit sections across the circuit design layout 210. Although the circuit section 216 as referred to herein is not limited, the method described herein is most useful when the element pattern 220 that is included in the circuit section 216 includes at least one confined vertex 222 within the circuit section 216. As referred to herein, a "confined vertex" refers to a corner or intersection of elements of the element pattern 220 that is wholly contained within the peripheral boundary 218 of the circuit section 216, i.e., the confined vertex 222 does not lie on the peripheral boundary 218. The methods described herein are particularly useful when the element pattern 220 within the circuit section 216 includes at least two different elements therein, e.g., two different lines 214 that do not contact each other, which enables interrelationships between the elements in the element pattern 220 to be analyzed for problems. In an embodiment and referring to FIG. 2, the peripheral boundary 218 of the circuit section 216 intersects at least one element of the circuit design layout 210, thereby creating a new vertex 224 between the peripheral boundary 218 and the element of the circuit design layout 210 at each instance where the peripheral boundary 218 intersects elements of the circuit design layout 210, with the new vertices 224 lying on the peripheral boundary 218.

As referred to herein, a match between a circuit section and a problematic section is confirmed when elements in the element pattern that is contained in the circuit section are identical to or fall within a pre-set deviation range from a particular problematic section. Physical pattern matching may be employed to determine if a circuit section or circuit sections match a problematic section in the first library, as described above. For example, in an embodiment, problematic sections are compared to circuit sections that have the same confined vertex or vertices as the problematic sections as one measure that is employed to determine if a match or mis-match exists. In a further embodiment, when the problematic sections include at least two different elements, the problematic sections are compared to circuit sections that have the same number of elements to determine if a match exists using the computer processor. In yet a further embodiment, when the peripheral boundary of the problematic element patterns intersect at least one element of a circuit design layout, the problematic element patterns are compared to circuit sections that have a peripheral boundary that intersects the at least one element of the circuit design layout in the same manner as the problematic element patterns. Various measurements of distances between the peripheral boundary of the circuit section and element pattern contained therein may be employed to determine whether a match to a problematic section exists, and various measurements of distances between elements in the circuit section can also be employed for purposes of determining whether a match to a problematic section exists. It is to be appreciated that a range of the various distance measurements may be established whereby a value within the range represents a sufficient match between circuit sections and problematic element sections, thereby creating a buffer that enables identification of a match for circuit sections and problematic element sections without requiring an identical physical match.

In an embodiment and as shown in FIG. 1, a determination is made if a circuit section matches a problematic section in the first library in block 106, followed by sequentially determining if other circuit sections match problematic sections in the first library. The method provided herein generally involves determining if a plurality of circuit sections matches problematic sections in the first library to enable blanket coverage of the circuit design layout. In this manner, a determination can be made of whether circuit sections match problematic sections across the circuit design layout to effectively break up the circuit design layout into smaller units that can be more readily analyzed. Furthermore, determinations are made on whether overlapping circuit sections match problematic sections, which enables more complete testing of the element patterns across the entire circuit design layout. For example, in an embodiment and as shown in FIG. 2, an initial circuit section 216 including an element pattern within the circuit design layout 210 is determined to match a problematic section, and another circuit section 217 that includes another element pattern within the circuit design layout 210 is determined to match another problematic section in the first library, with the other circuit section 217 including a peripheral boundary 219 that overlaps the peripheral boundary 218 of the initial circuit section 216. As referred to herein, the terms "initial" and "another" that are used when referring to the circuit sections 216, 217 merely serve to distinguish an earlier circuit section that is determined to match a problematic section from a later circuit section that is determined to match a problematic section, and it is to be appreciated that further circuit sections may be determined to match problematic sections from the first library either before or after the "initial" circuit section is determined to match a problematic section. While at least some of the circuit sections overlap, it is to be appreciated that some of the circuit sections can be completely independent of other circuit sections. As described in further detail below, conflict resolution techniques are provided in accordance with the methods described herein that enable complications from circuit section overlap to be avoided.

Referring to block 108 in FIG. 1, a second library of replacement sections is provided, with the replacement sections including replacement element patterns. The replacement sections correspond to the problematic sections in the first library and enable one or more problems that are associated with the problematic sections to be alleviated. As referred to herein, the replacement sections correspond to the problematic sections by providing the same functionality as the problematic sections but also incorporate a design change in the element pattern that alleviates one or more problems that are associated with the corresponding problematic sections. By providing the replacement sections in the second library that correspond to the problematic sections, the method described herein provides a pattern-based approach to replacement of the problematic sections in the circuit design layout. In an embodiment, the replacement patterns in the replacement sections correspond to the problematic sections in that at least boundary characteristics of the replacement section are substantially the same as the problematic section, and by extension the circuit section that is replaced by the replacement section, so that the same elements that intersect the peripheral boundary of the circuit section also intersect the peripheral boundary of the replacement section in substantially the same location, thereby minimizing stitching complications that could otherwise result from replacement of the circuit section. In an embodiment, the second library is stored in the storage medium and is accessible by the computer processor so that, upon determination that a circuit section matches a problematic section in the first library, the second library is available to enable replacement of the circuit section with the appropriate replacement section.

In accordance with the methods described herein, the second library of replacement sections may be provided by building the second library of replacement sections based upon identified solutions for the problematic sections. Alternatively, the second library of replacement sections can be obtained from an outside service provider. The replacement sections in the second library can be created by determining fixes to individual problematic element patterns, and implementing the fixes into the problematic sections to generate replacement sections. The replacement sections may be created by using simulation results or by using results from actual implementation of modifications to problematic element patterns, such as by fabricating physical test structures. For example, the second library can be built by creating variants of the element pattern in the corresponding problematic sections and performing printability simulations, with suitable replacement sections identified for problematic sections based upon the results of the printability simulations.

After determining that one or more circuit sections match problematic sections from the first library, and as shown in block 110 in FIG. 1, the exemplary method proceeds with replacing circuit sections that match problematic sections with a replacement section that corresponds to the respective problematic sections using the computer processor. Replacement of the one or more circuit sections is conducted through a local approach, where only the particular circuit section that is determined to match the problematic section is replaced with a particular replacement pattern. In the local approach, any circuit sections that are to be replaced are individually determined to match a problematic section, and there is no global rule implementation across the circuit design layout for purposes of modifying element patterns within the circuit design layout. In an embodiment, circuit sections that match problematic sections are replaced with replacement sections that correspond to the problematic sections after determining whether the circuit sections match problematic sections. In this manner, conflicts in pattern replacement that may arise due to circuit section overlap can be addressed together based upon which circuit sections require replacement. Further details regarding resolution of conflicts due to overlap of circuit sections that require replacement are described in further detail below. In other embodiments and although not shown, it is to be appreciated that replacement of circuit sections that match problematic sections from the first library may be conducted after a determination is made of whether each circuit section matches a problematic section, i.e., replacement of one circuit section with a replacement section can be conducted before determining whether other circuit sections match problematic sections in the first library in a looped approach to pattern replacement. The looped approach to pattern replacement may be appropriate if no circuit section overlap exists across the circuit design layout.

Figure 3:
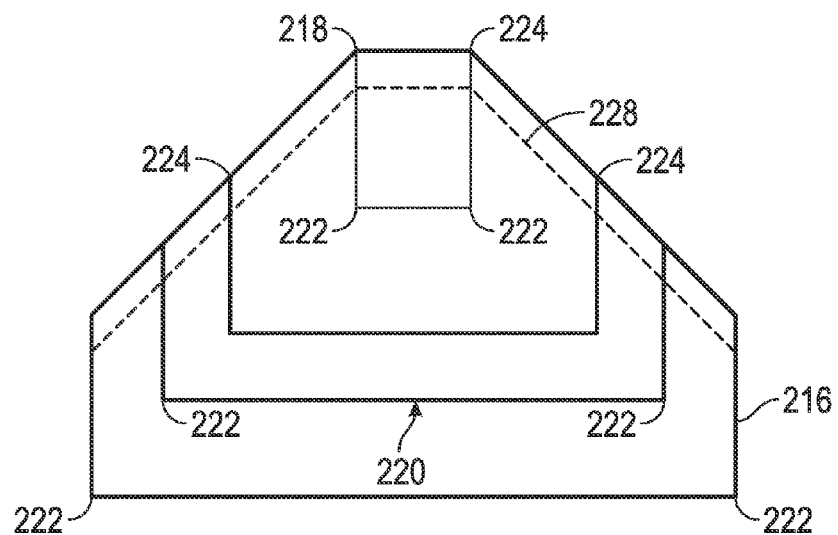
FIG. 3 is a schematic top view of a circuit section taken from the circuit design layout of FIG. 1 in accordance with an exemplary embodiment.
Figure 4:
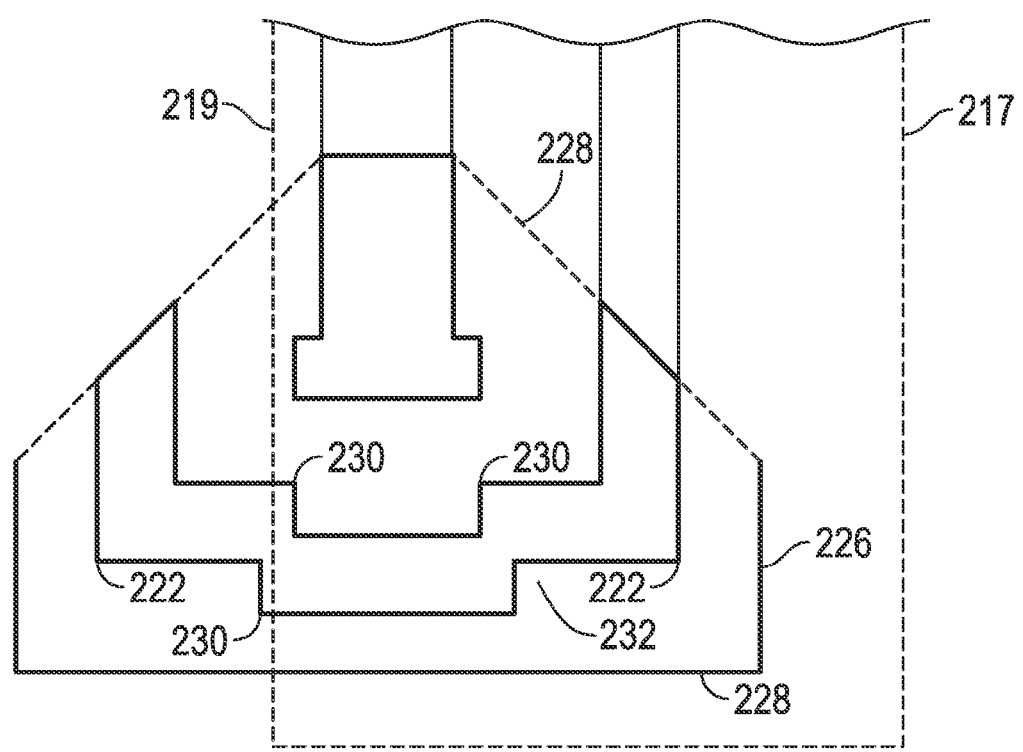
FIG. 4 is a schematic top view of a replacement section that replaces the circuit section of FIG. 3 in accordance with an exemplary embodiment.

In an embodiment and referring momentarily to FIG. 4, the replacement section 226 that corresponds to the problematic section, and by extension the circuit section that is determined to match a particular problematic section, has substantially the same boundary characteristics as the circuit section that is replaced by the replacement pattern 226, with the peripheral boundary 228 of the replacement section 226 and the peripheral boundary 218 of the circuit section shown in FIG. 3. "Boundary characteristics" as referred to herein, refer to layout of element features that cross the peripheral boundaries and affect the geometries thereof. Peripheral boundaries between the circuit section and the replacement section need not be identical to have substantially the same boundary characteristics. As alluded to above, matching of the boundary characteristics between the circuit section and the replacement section ensures that the same elements that cross the peripheral boundary of the circuit section also cross the peripheral boundary of the replacement section in the same location, thereby avoiding stitching complications that could otherwise result from replacement of the circuit section. In an embodiment and as shown in FIGS. 3 and 4, the replacement section (as shown in FIG. 4) has the same number of vertices on the peripheral boundary of the replacement section as the number of vertices on the peripheral boundary of the corresponding problematic section (as shown in FIG. 3). In a further embodiment, the location of the vertices on the peripheral boundary of the replacement section is also the same as the location of vertices on the peripheral boundary of the corresponding problematic section. In yet further embodiments, although not shown in the Figures, the element pattern in a particular circuit section may include an electrical interconnect that is provided to establish electrical connection between overlying elements and underlying elements relative to the circuit design layout, i.e., the electrical interconnect provides an electrical connection between the overlying element and the underlying element relative to the circuit design layout. In this embodiment, the replacement section also includes the electrical interconnect in the same location as the circuit section that is replaced thereby to maintain the connectivity provided by the position of the electrical interconnect within the circuit section that is replaced by the replacement section.

In an embodiment and as shown in FIGS. 3 and 4, at least one of the replacement sections 226 is smaller than the circuit section 216 that is replaced by the replacement section 226. For example, the replacement section 226 may be reduced in dimension relative to the circuit section 216 on sides of the replacement section 226 where the peripheral boundary 228 of the replacement section 226 intersects at least one element of the circuit design layout 210. By providing the replacement section 226 that is smaller than the circuit section 216, and particularly with the replacement section 226 reduced in dimension relative to the circuit section 216 on sides where the peripheral boundary 228 of the replacement section 226 intersects at least one element of the circuit design layout, the circuit section 216 can be replaced with the replacement section 226 without impacting other elements of the circuit design layout that are adjacent to the circuit section 216 that is replaced while still effectively alleviating problems that are associated with the problematic element pattern 220 to be replaced.

While the replacement sections that correspond to the problematic sections have substantially the same boundary characteristics, the replacement section generally has a different internal element pattern from the problematic section, and by extension the circuit section that is replaced by the replacement section, which alleviates one or more of the problems associated with the problematic element pattern in the problematic section. In an embodiment and referring momentarily to FIG. 4, at least one of the replacement sections 226 that replace the circuit sections includes a replacement pattern 232 that has a new vertex 230 in the replacement pattern 232, and the replacement pattern 232 may include a plurality of new vertices 230. The new vertices 230 are confined within the peripheral boundary 228 of the replacement section 226, which avoids boundary complications that may otherwise result if any of the new vertices 230 were to be located on the peripheral boundary 228. In an embodiment, the replacement sections 226 that replace the circuit sections do not modify the electrical connectivity within the circuit sections, meaning that electrical connectivity both within the circuit design layout remains the same between the replacement section and the circuit section replaced thereby, and also that electrical connectivity to overlying elements and the underlying elements relative to the circuit design layout also remain the same between the replacement section and the circuit section replaced thereby.

Optionally, after replacement of any circuit sections that match problematic sections and as shown in FIG. 1, further determinations of whether the circuit sections match problematic sections can again be conducted to verify that the replacement sections do not give rise to other problems. Once it is determined that no further circuit sections match problematic sections, a final circuit layout is generated that includes any replacement sections along with original circuit sections from the circuit design layout. In an embodiment, a mask may then be generated for the final circuit layout as shown in block 112 in FIG. 1, with the final circuit layout transferred to the mask. Techniques for generating a mask from a circuit design layout are known in the art and can be conducted using the computer processor in conjunction with patterning tools. In an embodiment, the mask is generated by transferring the circuit design layout into a first mask layer, such as through a lithography technique. Suitable lithography techniques include photolithography, embossing, nanoimprinting, and the like. In an embodiment, the replacement sections are transferred into the first mask layer concurrent with transferring the circuit design layout into the first mask layer, with the replacement sections supplanting problematic elements of the circuit design layout in the first mask layer. In another embodiment, the replacement sections are transferred separate from the circuit design layout. For example, the replacement sections may be transferred into a second mask layer that overlies the first mask layer, with the second mask layer including the element patterns of the replacement sections as modifications to the circuit design layout in the first mask layer. In all embodiments, the mask includes the final circuit layout therein.

As indicated in block 114, the method further includes employing the mask generated in block 112 to transfer a final circuit layout to the mask. The mask is employed to fabricate the semiconductor device by implementing the final circuit layout in or on a semiconductor substrate. The semiconductor substrate may be included, for example, in an integrated circuit. An exemplary manner in which the mask may be employed to implement the final circuit layout in or on the semiconductor substrate includes transferring the final circuit layout through the mask to a photoresist layer over the semiconductor substrate, followed by etching the semiconductor substrate or a layer that overlies the semiconductor substrate through the final circuit layout in the photoresist layer to form an etched pattern in or on the semiconductor substrate. The etched pattern may then be filled to form an electrical circuit in or on the semiconductor substrate, consistent with known integrated circuit fabrication techniques.

An exemplary embodiment of a method for modifying a physical design of an electrical circuit used in the manufacture of a semiconductor device will now be described with reference to FIGS. 2-4. As shown in FIG. 2 and as alluded to above, a circuit design layout 210 is provided with a plurality of element patterns that are formed by lines 214. A circuit section 216 that is determined to match a problematic section in the first library includes an element pattern 220 without a peripheral boundary 218 of the circuit section 216 extending longitudinally within elements in the element pattern 220, i.e., the shape of the circuit section 216 that matches a problematic section has the peripheral boundary 218 that intersects elements in the element pattern 220 but is largely located within pattern-free portions. While the circuit section 216 that matches a problematic section has a polygonal shape in the embodiment shown in FIG. 2, it is to be appreciated that the shape is arbitrary, based upon particular problematic patterns in the first library to which the circuit sections are determined to match, and is not limited to the configuration shown. Referring to FIG. 3, in this example, the decision is made that replacement of the circuit section 216 that matches a problematic section is required. The hatched line in FIG. 3 represents a shortened peripheral boundary 228 of the replacement section 226, as represented in FIG. 4, with the replacement section 226 reduced in dimension relative to the circuit section 216 on sides of the replacement section 226 where the peripheral boundary 228 of the replacement section 226 intersects elements of the circuit design layout. The replacement section 226 includes ten new vertices 230 that are confined within the peripheral boundary 228 of the replacement section 226. The mask is then generated with the replacement section 226, and with original sections of the circuit design layout that are not replaced, in the manner described above.

Figure 5:
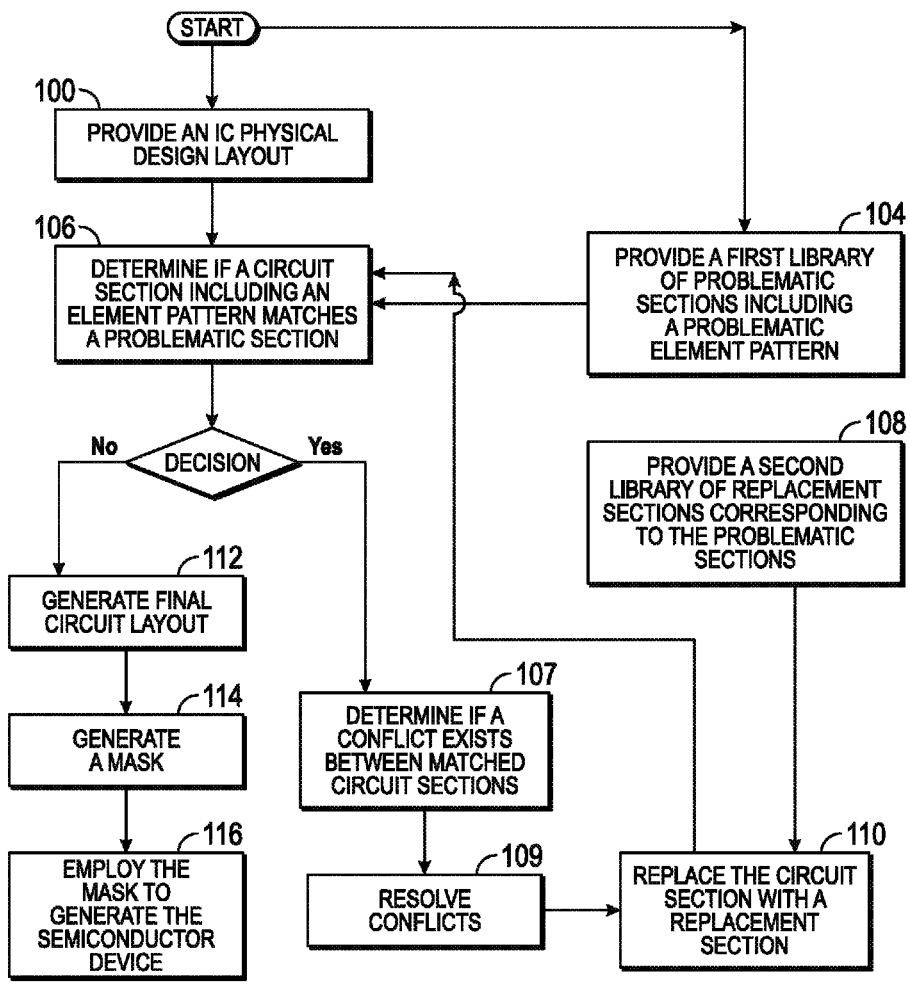
FIG. 5 is a flow chart illustrating a method for fabricating a semiconductor device in accordance with another embodiment.
Figure 6:
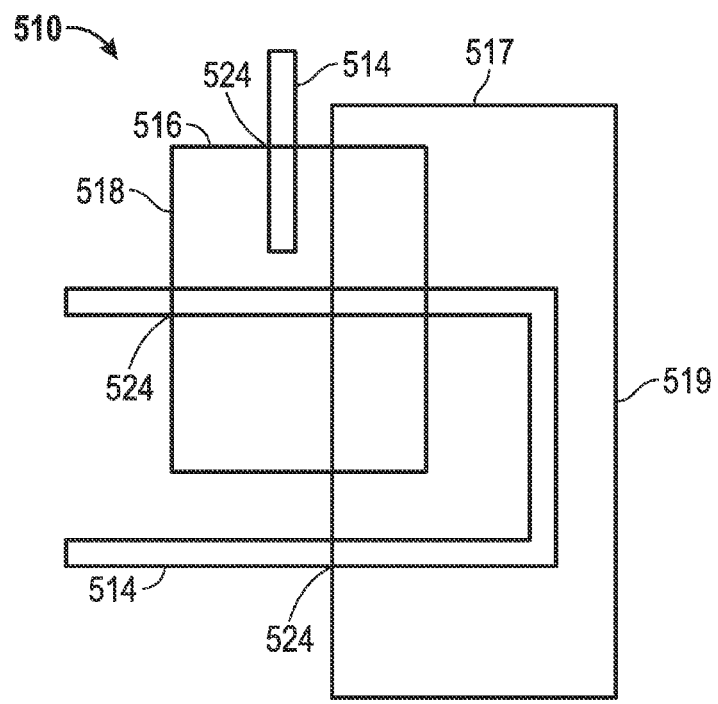
FIG. 6 is a schematic top view of another exemplary embodiment of a circuit design layout with overlapping circuit sections.
Figure 7:
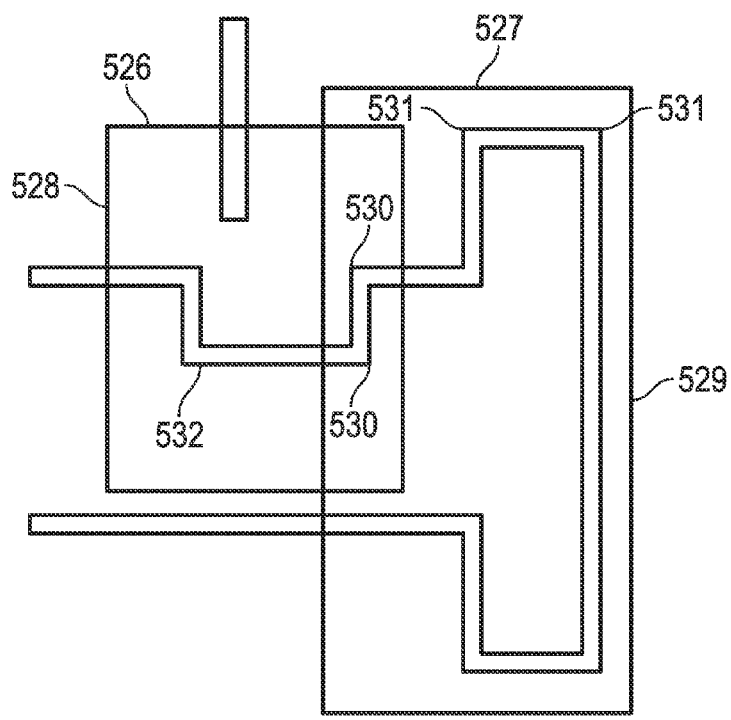
FIG. 7 is a schematic top view of the circuit design layout of FIG. 6 after replacement of the overlapping circuit sections with respective replacement sections in accordance with an exemplary embodiment.

Another exemplary embodiment of a method for modifying a physical design of an electrical circuit used in the manufacture of a semiconductor device will now be described with reference to FIGS. 5-7. In this embodiment, the method is identical to the method described above in the context of FIG. 1 but provides for additional conflict resolution functionality in the event of circuit section overlap. As shown in FIG. 6, a circuit design layout 510 is provided with a plurality of element patterns that are formed by lines 514. However, in this embodiment, an initial circuit section 516 and another circuit section 517 within the circuit design layout 510 are determined to match a problematic section in the first library, with the decision made that replacement of the initial circuit section 516 and the other circuit section 517 is required. For purposes of the instant application and referring to FIGS. 6 and 7, a conflict is determined to exist when the other circuit section 517 overlaps the initial circuit section 516, the initial replacement section 526 or an other replacement section 527 contains a new vertex that is confined within a peripheral boundary thereof, and when the new vertex is also within a peripheral boundary of the overlapping circuit section 216, 217. For example and as shown in FIG. 6, the other circuit section 517 overlaps the initial circuit section 516 to illustrate conflict resolution techniques that may be employed in accordance with the method shown in FIG. 5, which enables complications from circuit section overlap to be avoided. Referring to FIG. 5, after determining that a circuit section matches a problematic section, a determination is made if a conflict exists between matched circuit sections, as shown in block 107. For example, as shown in FIG. 7, the initial replacement section 526 is determined to be in conflict with the other replacement section 527 because a replacement element pattern 532 in the initial replacement section 526 includes new vertices 530 that also lie within the other replacement section 527. However, the other replacement section 527 is not in conflict with the initial replacement section 526 because no new vertices 531 of the other replacement section 527 lie within the initial replacement section 526.

As shown in FIG. 5 at block 109, conflicts are resolved prior to replacing the matched circuit sections that are determined to match a problematic section. To determine order of replacement under circumstances where there is a conflict, one of the circuit sections that has the least number of new vertices within the peripheral boundary of the overlapping circuit section are replaced before replacing circuit sections that have more new vertices within the peripheral boundary of the overlapping circuit section. In the embodiment shown in FIGS. 6 and 7, the other replacement section 527 has no new vertices within the peripheral boundary of the initial circuit section 516, whereas the initial replacement section 526 has new vertices within the peripheral boundary of the other circuit section 517. As such, the other circuit section 517 is replaced prior to replacing the initial circuit section 516 because the other replacement section 527 will not impact the initial replacement section 526. Such an approach may enable simple, automated conflict resolution; however, it is to be appreciated that other conflict resolution techniques may be employed to ensure that conflicts do not give rise to further problems upon replacement of conflicting circuit sections with replacement sections. Although not shown, it is to be appreciated that in other embodiments, one or more of the circuit sections may overlap multiple other circuit sections, with the circuit sections containing new vertices confined within a peripheral boundary thereof that are also within a peripheral boundary of multiple other overlapping circuit sections. In these embodiments, one of the circuit sections having no new vertices within the peripheral boundary of the overlapping circuit sections are replaced before replacing circuit sections that have the new vertices within the peripheral boundary of the overlapping circuit sections, with circuit sections having the least number of new vertices that are also within a peripheral boundary of other overlapping circuit sections replaced before circuit sections that have greater numbers of new vertices that are also within a peripheral boundary of other overlapping circuit sections.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for modifying the physical design of an electrical circuit used in the manufacture of a semiconductor device, the method comprising:
   providing a circuit design layout having a plurality of element patterns;
   providing a first library of problematic sections that include a problematic element pattern, wherein the first library is stored in a storage medium;
   determining that an initial circuit section including an element pattern within the circuit design layout matches a problematic section in the first library using a computer processor in communication with the storage medium, wherein the initial circuit section includes a peripheral boundary;
   determining that another circuit section including another element pattern within the circuit design layout matches another problematic section in the first library using the computer processor in communication with the storage medium, wherein the other circuit section includes a peripheral boundary overlapping the peripheral boundary of the initial circuit section;
   providing a second library of replacement sections stored in the storage medium, wherein the replacement sections include a replacement element pattern and correspond to the problematic sections;
   replacing only the circuit sections that match the problematic sections with a replacement section that corresponds to the respective problematic sections using the computer processor to form the final circuit layout including the replacement sections and original sections of the circuit design layout.

2. The method of claim 1, wherein the problematic sections include at least one confined vertex that is located within a peripheral boundary of the problematic sections, and wherein determining that the circuit sections match the problematic sections comprises comparing problematic sections that include the confined vertex to circuit sections having the same confined vertex as the problematic sections using the computer processor.

3. The method of claim 2, wherein at least one of the problematic sections includes at least two different elements therein, and wherein determining that the circuit sections match the problematic sections comprises comparing the problematic sections to circuit sections that have the same number of elements to determine if a match exists using the computer processor.

4. The method of claim 1, wherein providing the second library of replacement sections comprises building the second library of replacement sections based upon identified solutions for the problematic sections.

5. The method of claim 4, wherein building the second library of replacement sections comprises creating variants of the element pattern in the corresponding problematic sections and performing printability simulations.

6. The method of claim 1, wherein providing the first library of problematic sections comprises providing the first library of problematic sections that include a problematic element pattern having a known printing or electrical problem associated therewith.

7. The method of claim 1, wherein replacing the circuit sections comprises replacing the circuit sections with the replacement sections with boundary characteristics of the replacement sections being substantially the same as the circuit sections replaced thereby.

8. The method of claim 1, wherein at least one of the replacement sections that replace the circuit sections include a replacement pattern having a new vertex in the replacement pattern, wherein the new vertex is confined within a peripheral boundary of the replacement section, and wherein replacing the circuit sections with the replacement sections comprises replacing at least one of the circuit sections with the replacement section including the new vertex.

9. The method of claim 8, wherein replacing at least one of the circuit sections with the replacement section including the new vertex comprises replacing at least one of the circuit sections without modifying the electrical connectivity within the circuit section.

10. The method of claim 1, wherein a peripheral boundary of the problematic sections intersects at least one element of the circuit design layout, and wherein determining that the circuit section matches the problematic section comprises determining that a problematic section having the peripheral boundary that intersects the at least one element of the circuit design layout matches the circuit section.

11. The method of claim 10, wherein replacing the circuit sections with the replacement sections comprises replacing the circuit sections with the replacement sections, and wherein at least one of the replacement sections is smaller than the circuit section replaced thereby.

12. The method of claim 10, wherein the replacement section that is smaller than the circuit section is reduced in dimension relative to the circuit section on sides of the replacement section where a peripheral boundary of the replacement section intersects at least one element of the circuit design layout, and wherein replacing at least one of the circuit sections with the replacement section that is smaller than the circuit section comprises replacing the circuit section with the replacement section that is reduced in dimension on sides thereof where the peripheral boundary of the replacement section intersects at least one element of the circuit design layout.

13. The method of claim 1, wherein at least one of the initial replacement section or the other replacement section contains a new vertex confined within a peripheral boundary thereof, wherein the new vertex is also within a peripheral boundary of the overlapping circuit section, and wherein replacing the initial circuit section and replacing the other circuit section comprise first replacing one of the circuit sections having no new vertices within the peripheral boundary of the overlapping circuit section before replacing circuit sections having the new vertex within the peripheral boundary of the overlapping circuit section.

14. The method of claim 12, wherein one of the circuit sections overlaps multiple other circuit sections, contains a new vertex confined within a peripheral boundary thereof, and wherein the new vertex is also within a peripheral boundary of the overlapping circuit sections, and wherein replacing the initial circuit section and replacing the other circuit section comprise first replacing one of the circuit sections having the least number of vertices within the peripheral boundary of the overlapping circuit sections before replacing circuit sections having more new vertices within the peripheral boundary of the overlapping circuit sections.

15. A method for fabricating an integrated circuit, the method comprising:
   providing a circuit design layout for a mask, wherein the circuit design layout has a plurality of element patterns;
   providing a first library of problematic sections that include a problematic element pattern, wherein the first library is stored in a storage medium;
   determining that an initial circuit section including an element pattern within the circuit design layout matches a problematic section in the first library using a computer processor in communication with the storage medium, wherein the initial circuit section includes a peripheral boundary;
   determining that another circuit section including another element pattern within the circuit design layout matches another problematic section in the first library using the computer processor in communication with the storage medium, wherein the other circuit section includes a peripheral boundary overlapping the peripheral boundary of the initial circuit section;
   providing a second library of replacement sections stored in the storage medium, wherein the replacement sections include a replacement element pattern and correspond to the problematic sections;
   replacing only the circuit sections that matches the problematic sections with a replacement section that corresponds to the respective problematic sections using the computer processor, wherein boundary characteristics of the replacement sections are substantially the same as the circuit sections replaced thereby;
   generating the mask including the replacement sections and original sections of the circuit design layout to transfer a final circuit layout to the mask; and
   employing the mask to implement the final circuit layout in or on a semiconductor substrate.

16. The method of claim 15, wherein generating the mask comprises transferring the circuit design layout into a first mask layer.

17. The method of claim 16, wherein generating the mask further comprises transferring the replacement section into the first mask layer concurrent with transferring the circuit design layout into the first mask layer.

18. The method of claim 16, wherein generating the mask further comprises separately transferring the replacement section into a second mask layer overlying the first mask layer.

19. The method of claim 18, further comprising forming an overlying dielectric layer over the electrically-conductive material in the etched pattern.

20. A method for fabricating an integrated circuit comprising:

providing a circuit design layout for a mask, wherein the circuit design layout has a plurality of element patterns;

providing a first library of problematic sections that include a problematic element pattern having a known printing or electrical problem associated therewith, wherein the first library is stored in a storage medium;

sequentially determining whether circuit sections including element patterns within the circuit design layout match a problematic section in the first library using a computer processor in communication with the storage medium, wherein an initial circuit section matches a problematic section in the first library and another circuit section including another element pattern within the circuit design layout matches another problematic section in the first library, wherein the other circuit section includes a peripheral boundary overlapping the peripheral boundary of the initial circuit section, wherein at least one of the initial replacement section or the other replacement section contains at least one new vertex confined within a peripheral boundary thereof, and wherein the at least one new vertex is also within a peripheral boundary of the overlapping circuit section;

providing a second library of replacement sections stored in the storage medium, wherein the replacement sections include a replacement element pattern and correspond to the problematic sections;

replacing circuit sections having fewer new vertices within the peripheral boundary of the overlapping circuit section and that match the problematic sections with replacement sections that correspond to the problematic sections using the computer processor before replacing circuit sections having more new vertices within the peripheral boundary of the overlapping circuit section, wherein boundary characteristics of the replacement sections are substantially the same as the circuit sections replaced thereby;

generating the mask including the replacement sections and original sections of the circuit design layout to transfer a final circuit layout to the mask;

employing the mask to implement the final circuit layout in or on a semiconductor substrate of the integrated circuit.

* * * * *